April 21, 1970   R. T. HOGLUND   3,507,619
METHOD AND APPARATUS FOR CRUDE FIBER DETERMINATION
Filed Dec. 28, 1966   2 Sheets-Sheet 1

INVENTOR
RICHARD T. HOGLUND
BY *Bair, Freeman & Molinare*
ATTORNEYS.

United States Patent Office 3,507,619
Patented Apr. 21, 1970

3,507,619
METHOD AND APPARATUS FOR CRUDE FIBER DETERMINATION
Richard T. Hoglund, 4543 Sayre,
Harwood Heights, Ill. 60656
Filed Dec. 28, 1966, Ser. No. 605,411
Int. Cl. G01n *33/02;* B01l *3/00*
U.S. Cl. 23—230          6 Claims

ABSTRACT OF THE DISCLOSURE

About 2 g. of ground feed sample (20 mesh) is placed within a tubular digestion unit having means for securing retaining screens at both ends. The digestion unit is preferably of stainless steel but may be made of any material that will withstand the chemical and heat environment of the analytic steps. The sample remains within the digestion unit throughout the analytic steps, and the unit may be transferred to the different solutions without loss of sample.

BACKGROUND OF THE INVENTION

The field of art to which this invention relates is that of fiber determination in feeds and feed stuffs, such as corn, soy beans, and other grain feed stuffs, as well as the prepared composite feed in the form of pellets or mash. The present invention provides an improved sample container and a method of the analysis for the crude fiber content in such feeds that provides a vast saving in time, increased accuracy of analytic results, and which may be accomplished by the use of fewer pieces of apparatus as well as apparatus of a relatively inexpensive and simple construction.

Most typical of prior art crude fiber determination is that designated by the American Organization of Agricultural Chemists as the official method. The following are the steps of the determination in that method:

(1) From a representative sample of feed which has been ground to less than 20 mesh size a small portion of about 2 gm. is dried in an oven at about 105° C. If moisture is to be determined, the appropriate weights before and after drying may be taken as in Official Method 22.003 or 22.007, A.O.A.C.

(2) The 2 gm. of dry material is then extracted with ether, or the residue from a Crude Fat or Ether Extract determination (A.O.A.C. method 22.033 or 22.034) may be used. Anhydrous ether, according to the Official Method 22.032, is used and a porous thimble as provided by method 22.033, or a filter paper cup is utilized as the defatting vessel. After the ether extraction, the vessel is then dried.

(3) The residue is then scraped from the filter paper cup or the thimble and transferred together with about 0.5 gm. of asbestos to a digestion flask. The asbestos is Gooch grade, medium fiber, acid-washed and ignited, but should be tested for chemical stability and filtering speed before use. The preparation of the asbestos is set forth in the Official Method 22.038(c). Any digestion flask of such size and shape that a solution is not less than 1 inch nor more than 1.5 inches in depth may be used. Commonly, a 700 to 750 ml. Erlenmeyer flask is used as the digestion flask. To the sample and the asbestos filtering aid in the digestion flask is added 200 ml. of the boiling $H_2SO_4$ solution. The sulfuric acid solution is 0.255 N. which corresponds to 1.25 gm. of $H_2SO_4/100$ ml. The digestion flask is immediately connected with a condenser of such type that maintains a constant volume of solution throughout the digestion, and the assembly is heated. The Official Method recommends that the contents of the flask must come to a boiling within one minute, and the boiling must continue briskly exactly 30 minutes. The normal procedure is that the flask should be rotated frequently until the sample is thoroughly wetted, and if the sample is difficult to wet, three drops of a diluted Dow-Corning Antifoam A emulsion may be added to the solution. It is necessary to take care to keep the sample material from remaining on the sides of the flask out of contact with the solution. Optionally, a blast of air may be conducted into the flask to serve to reduce frothing of the sulphuric acid solution. By this digestion step, all the acid soluble portions of the sample are digested.

(4) After 30 minutes of the above digestion, the digestion flask is removed and the contents are immediately filtered through linen in a fluted funnel, and the flask, funnel, and linen is washed with boiling water until the washings are no longer acid. In place of the linen filter a piece of burlap, or a California Modified Buchner funnel or an Oklahoma Filter Screen such as are made by Labconco of Kansas City, Mo., may be used.

(5) The sample remaining on the linen filter is washed along with its asbestos back into the flask with 200 ml. of a boiling NaOH solution. The sodium hydroxide solution is 0.313 N, which corresponds to 1.25 gm. NaOH/100 ml., free, or nearly so, of $Na_2CO_3$. Any portion of the sample or filter media that remains on the linen filter should be scraped from the filter and placed into the flask. Less than two minutes time should elapse between the start of step 4 and the end of step 5.

(6) The flask containing the sample is then connected to a reflux condenser and boiled for exactly 30 minutes.

(7) The flask is removed from the heat and the contents are immediately filtered through a gooch which is prepared with an asbestos mat. Alternatively, an Alundum crucible, or a filtering cloth in a fluted tunnel may be used. If a filtering cloth is used, it should be of such character that no solid matter passes through when the filtering is rapid. The retention of the filtering cloth may be tested by passing the filtrate through a gooch. Butcher's linen or dress linen with about 45 threads/inch or No. 40 filtering cloth made by National Filter Media Corp., New Haven, Conn., or its equivalent, may be used. When the filtering cloth is used, residue should be thoroughly washed with boiling water and transferred to a gooch prepared with a thin but close layer of ignited asbestos. Where the materials are difficult to filter, a filtering cloth in a fluted funnel under vacuum may be used and the material may be washed with a hot 10% $K_2SO_4$ solution. The residue is returned to the digestion flask and all residue is washed from the filter cloth with the hot potassium sulfate solution. The residue is then filtered into a gooch prepared as before with a thin but close layer of ignited asbestos. The residue after filtering in the gooch, is thoroughly washed with boiling water and with about 15 ml. of alcohol.

(8) The crucible and contents are then oven dried at 110° C. to a constant weight. The crucible and contents are then cooled in a desiccator and then weighed, which weight is recorded as weight No. 1.

(9) The crucible with its contents are then ignited in an electric muffle, or over a Meker burner at a dull red heat, until the carbonaceous matter is consumed (around 20 minutes).

(10) The ashed crucible and sample is then weighed after cooling in a desiccator. This weight is recorded as Weight No. 2.

The loss in weight (weight No. 2 minus weight No. 1) is the indigestible material referred to as "crude fiber."

SUMMARY OF THE PRESENT INVENTION

By the present invention is provided a simple unitary apparatus into which the sample to be analyzed is initially placed, and in which the sample remains throughout the several digestions, washings, and weighing steps. It will be seen that no sample is lost from scraping of any filters, since the sample remains in the apparatus throughout the procedure. The numbers of different types of apparatus are also reduced, and the attendant manual skill and training necessary to follow the present official method is eliminated. The filtering steps are made simpler, and multiple samples each in a separate apparatus may be processed at the same time. By the present method approximately 18 daily analyses can be made, which means about 100 per week. By the apparatus and method of the present invention, more than 100 per day may be run simultaneously, thus meaning a five-fold increase in the number of determinations possible. Further, since there is no loss of samples during transference from a flask to a crucible or to a filter, and vice-versa, the crude fiber analysis by the present invention is more accurate. According to the present invention, also, duplicate samples do not face a different amount of loss in filtering and transference. Also, the time of digestion and rinsing will be identical for several samples, thus avoiding the type of variation and lack of precision that is occasioned by different analysts using slightly varying techniques.

Accordingly, it is among the objects of this invention to provide a simple apparatus that will retain the sample throughout an entire series of analytic steps, be able to withstand the actions of boiling acids and alkalies while contributing no chemical effect to the sample and having a negligible, if any, change in the physical properties of the apparatus. It is another object to provide an apparatus and a method whereby the free and rapid flow of digestion and extraction solutions may be passed through the sample while quantitatively retaining the sample to be analyzed. It is also an object to provide an apparatus which is reusable after a simple cleaning upon the completion of each analysis. Finally, it may be necessary for the cell or digestion unit to be able to withstand the effects of the high temperature ignition in the ashing step.

THE DRAWINGS

PREFERRED EMBODIMENTS

Figure 2A:
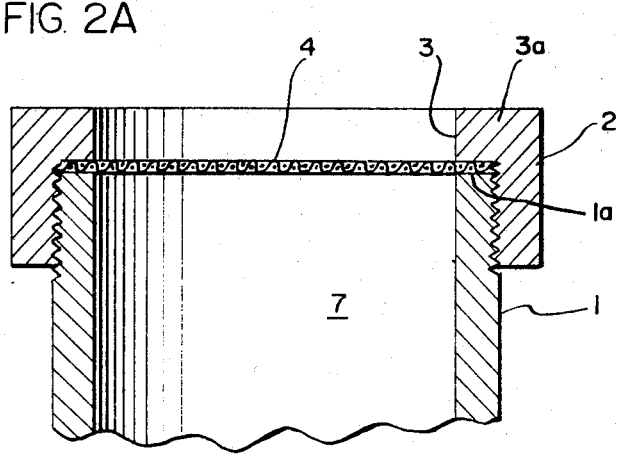
FIG. 2a shows one embodiment of a sample cell or digestion unit of the present invention.

Referring first to FIG. 2a, the sample cell or digestion unit of the present invention consists of a segment of tubing, which may be round or square as convenience suits. Threaded at each end of the piece of tubing is a corresponding cap 2, which is provided with an aperture therein indicated at 3. Held in position between the flange portion 3a of the cap and the lip portion 1a of the tubing is a screen 4. The space between the screens at each end of the tubing as held in place by the caps defines a sample chamber 7. The sample is very simply placed within the digestion unit or sample cell by removal of the cap and the screen, placing the sample material within the chamber and replacing the screen and cap, in that order.

In a preferred embodiment, the tubing cap, and screening are made of type 316 stainless steel. Although a single layer of screening is shown in FIG 2a, it is contemplated that there may be more than one layer of screening. For example, a 60 mesh type 316 stainless steel screen would be used on the interior of the digestion unit, adjacent and in contact with the lip 1a of the tubing, while a 200 to 350 mesh type 316 stainless steel screen would be used as a second layer adjacent the 60 mesh screen. The larger mesh screen thus would act as a backing screen, providing strength and preventing clogging, while the finer screen would serve to retain the ground sample which is of about 20 mesh size.

While stainless steel is contemplated as the preferred embodiment, also suitable are Monel metal and Nichrome. In those analyses where the final ashing step is not desired, the apparatus may be constructed of Teflon, Kel-F, or the better nylons. Any suitable plastic may be used so long as it is resistant to the reagents and heat involved.

Figure 2B:
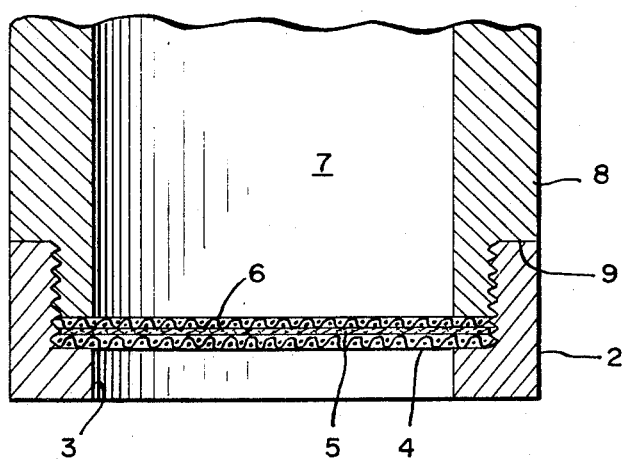
FIG. 2b shows a second embodiment of the sample cell or digestion unit adapted to be used with very finely ground sample materials such as flours.

Referrring now to FIG. 2b, the tubing 8 terminates at each end in threaded cap 2. The tubing 8 has a shoulder 9 thereon, which permits the outer cylindrical surface of the cap 2 to be contiguous with the cylindrical surface of the tube. Disposed between screen 4 and an inner screen 6, which may be of the same or different mesh size as disclosed above, is a glass-fiber filter paper 5. This embodiment is particularly useful where samples of very finely ground materials, such as flour, are being analyzed.

It should be understood that the tubular shape of the sample is not restricted to a cylindrical form. For example, in another embodiment, the tubular form may be rectangular, and in place of the threaded means for securing the cap at the end, other securing means such as a compression fit, a snap fit, or securing means such as screws or a retaining ring may be employed.

In a still further embodiment, an envelope of 200 to 350 mesh type 316 stainless steel screen may be backed by a similar 60 mesh screening to add strength and to prevent clogging. The envelope may be formed simply by the folding of the screen around the sample, to form a retaining pocket. Three sides of the envelope may be permanently secured together with one fold of screening being flexibly openable and closable for reuse.

The method of the invention is as follows:

(1) A two gram sample of the feed to be analyzed is ground to about 20 mesh, and the ground sample is placed in a digestion unit of the present invention. The cumulative weight of the unit plus sample is recorded as weight A. As will be discussed below, the weight of the empty, dry unit may be recorded as weight F.

(2) The unit containing the sample is then placed in an oven and heated at 105° C. until a constant weight is achieved. As discussed below, where the moisture is also to be determined, the weight of the dried sample is recorded as Weight B.

(3) The unit containing the dried sample is then washed with ether so that the ether passes through the screening and then contacts the sample retained therein, until the ether washes leave no residue upon drying. The unit and the thus defatted samples are then dried as before. If the fat content is to be determined, the unit may be weighed and the weight recorded as weight C.

(4) The unit containing the defatted sample is then suspended in boiling sulphuric acid of the concentration used in the Official Method. The acid is permitted to digest the sample in the unit for 30 minutes. Since the unit for a sample of about 2 grams is reasonably small, several of the units each containing different samples can be suspended in the same vessel, so long as the volume of the digestion solution in milliliters is about 100 times the weight of the samples placed therein.

(5) The units are drained of sulphuric acid solution, and then dipped into boiling distilled water several times, being permitted to drain after each immersion. Alternatively, the sample may be retained by gripping the tubing, and the boiling water may be poured through the upper screening to contact the sample within whereupon it then drains out through the bottom screening.

(6) The drained unit is then placed or suspended in boiling sodium hydroxide solution of the concentration used in the Official Method. The boiling solution is permitted to digest the sample for the period of 30 minutes. As with the acid digestion step, several digestion cells can be suspended in the same large vessel of solution, so long as the digestion solution in milliliters is about 100 times the weight of the samples placed therein.

(7) The sample is again rinsed in boiling water as in step 5 above, simply by dipping the digestion cell or passing the boiling water through the cell. The sample in the cell is then drained and rinsed with mehtanol in the same way as the water rinses.

(8) The sample still in its digestion unit, is then oven dried to a constant weight at 110° C. The weight is recorded as weight D.

(9) The unit and sample are then ignited in a furnace at 500° C., or over a Meker burner at dull red heat, until a constant weight is reached (usually within less than 30 minutes). The unit containing the ash is then cooled in a desiccator and weighed. The weight is recorded as weight E.

To repeat the process, the screens may be simply removed and cleaned in appropriate cleaning solutions, or the screens, if old, or fatigued from the chemical conditions, may be entirely replaced. The entire empty unit may be heated to constant weight and new samples placed therein with a repeat of the analytic process.

The calculations are as follows:

The crude fiber is represented by the weight D minus the weight F or the weight E, divided by the weight A minus the weight F. Where a determination of the moisture or fat is desired, the following calculations should be made:

For moisture, the weight A minus the weight B is divided by the weight A minus the weight F. For the fat, the weight B minus the weight C is divided by the weight A minus the weight F.

Figure 1:
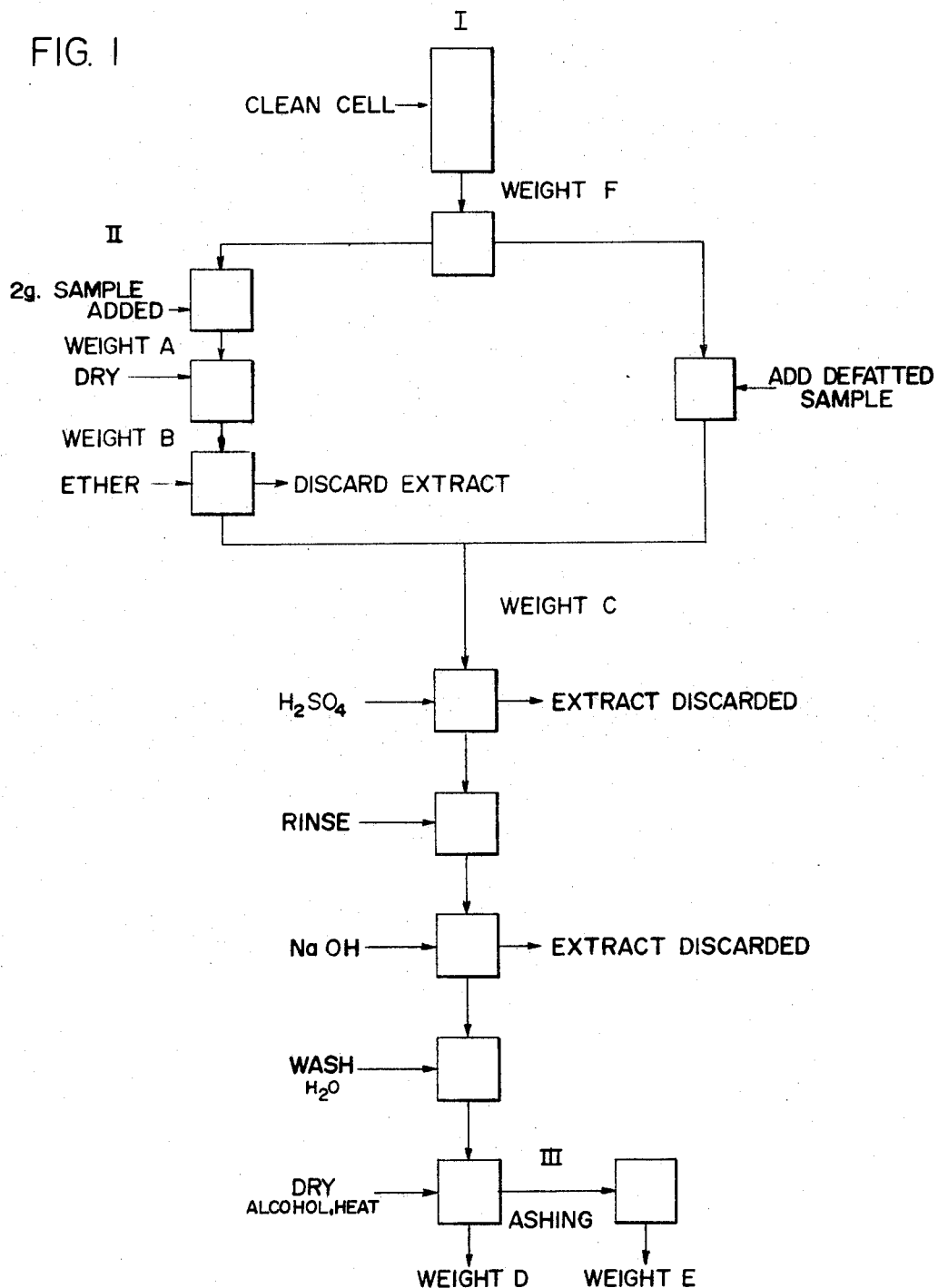
FIG. 1 shows a schematic flow diagram of the method of the invention with the optional paths II and III.

FIG. 1 illustrates the above described method and the optional paths labeled thereon as II and III. It will be appreciated that steps 1 through 9 follow the flow diagram starting at I, through optional moisture and fat determination route II, and include the optional ashing step labeled III. The method may be practiced by starting with a cell to which is added a defatted feed sample from a previous fat determination, as illustrated in the upper right hand optional route of FIG. 1. The method not including route II gives only a crude fiber determination, whether weight D or the ashing and weight E route III is followed.

As is seen from the above, the time spent in setting up and running the analysis is much less per unit than the prior art method. Further, the entire digestion can either be automated, or the work may be done together, handling a series of samples as a batch. It is also contemplated that appropriate pumping apparatus may be devised whereby a series of the digestion cells may be placed adjacent each other with the solutions passing first through one cell and then through a subsequent cell. Since large volumes of digestion solution are used, there is little or no chance of contamination between cells, and little chance of the solution becoming chemically exhausted during recirculation.

Where a moisture determination is not desired in all but the wettest of samplest, the sample weight used is of the original, not the dried sample, and thus an additional step is omitted. Further, it should be appreciated that the cell is not restricted to use merely in the fiber determination. The sample cell is useful wherever a single sample is subjected to a series of processing steps, each in turn acting upon the residue of the prior step. Of course, in such analyses, the filtrate may be retained for analysis.

It will be understood by those skilled in the art that the specific description of the exemplary embodiments of this invention is merely illustrative of the principles, and it will be obvious to those skilled in the art that changes may be made without departing from the spirit of the invention, and therefore the invention is not limited to what is shown in the drawings and described in the specification but only as indicated in the appended claims.

What I claim is:

1. A cell for a sample undergoing chemical analysis comprising:
   (a) means for containing said sample and defining a cell body, said body means being of substantially tubular shape and of stainless steel with openings at the ends thereof,
   (b) an end cap disposed at one end of said body means, said end cap being removably secured to said body means and having flange portions defining an aperture therethrough,
   (c) means for retaining said sample within said body means, said retaining means being perforate and including a plurality of stainless steel screens of differing mesh size, at least one of which is smaller than the size of said sample granules, said retaining means being disposed across said end cap aperture and between said end cap and said body means,
whereby fluids are permitted to flow through said body into intimate contact with said sample.

2. A cell of claim 1 in which a layer of filtering material is disposed between two of said screens.

3. A method for feed analysis comprising the steps of:
   (a) weighing a defatted sample into a tubular sample cell,
   (b) contacting said sample in said cell with a first digestion solution,
   (c) washing said sample in said cell,
   (d) contacting said sample in said cell with a second digestion solution,
   (e) washing said sample in said cell,
   (f) drying said sample in said cell,
   (g) weighing said cell and any remaining sample, whereby the crude fiber content of said sample may be determined by calculation from said weights.

4. A method of claim 3 including the additional steps in place of step (e) of:
   ($e_1$) heating said sample in said cell to ignite said sample until reduced to ash,
   ($e_2$) cooling said cell and any remaining sample, prior to weighing step (g).

5. A method of claim 3, including the additional preliminary steps in place of step (a) of:
   ($a_1$) grinding a feed sample to about 20 mesh,
   ($a_2$) placing a known amount of sample in a tubular sample cell having retaining screens removably secured at each end thereof,
   ($a_3$) drying said sample in said cell,
   ($a_4$) contacting said sample in said cell with a solvent to extract the fats therefrom, whereby the moisture, fat and crude fiber content of said sample may be determined by calculation from said weights.

6. A method of claim 5 including the additional steps in place of step (e) of:
   ($e_1$) heating said sample in cell to ignite said sample until reduced to ash,
   ($e_2$) cooling said cell and any remaining sample, prior to weighing step (j).

References Cited
UNITED STATES PATENTS

| | | | |
|---|---|---|---|
| 2,783,180 | 2/1957 | Whitehead | 118—500 X |
| 3,072,132 | 1/1963 | Middleton | 134—137 |
| 3,167,079 | 1/1965 | Weil | 134—137 |
| 3,411,481 | 11/1968 | Isreeli et al. | 23—259 |

MORRIS O. WOLK, Primary Examiner

E. A. KATZ, Assistant Examiner

U.S. Cl. X.R.

23—253, 259, 292; 118—500; 134—137